(12) United States Patent
Fujimoto

(10) Patent No.: US 9,854,610 B2
(45) Date of Patent: Dec. 26, 2017

(54) MANAGEMENT APPARATUS, MANAGING METHOD, AND WIRELESS COMMUNICATION SYSTEM

(71) Applicant: YOKOGAWA ELECTRIC CORPORATION, Tokyo (JP)

(72) Inventor: Naoyuki Fujimoto, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 175 days.

(21) Appl. No.: 14/767,999

(22) PCT Filed: Jan. 15, 2014

(86) PCT No.: PCT/JP2014/050569
§ 371 (c)(1),
(2) Date: Aug. 14, 2015

(87) PCT Pub. No.: WO2014/129232
PCT Pub. Date: Aug. 28, 2014

(65) Prior Publication Data
US 2015/0373756 A1 Dec. 24, 2015

(30) Foreign Application Priority Data
Feb. 22, 2013 (JP) ................. 2013-033683

(51) Int. Cl.
*H04W 72/00* (2009.01)
*H04W 76/02* (2009.01)
(Continued)

(52) U.S. Cl.
CPC .......... *H04W 76/02* (2013.01); *H04B 1/7143* (2013.01); *H04L 41/08* (2013.01);
(Continued)

(58) Field of Classification Search
None
See application file for complete search history.

(56) References Cited

U.S. PATENT DOCUMENTS

| | | | |
|---|---|---|---|
| 7,420,980 | B1 | 9/2008 | Pister et al. |
| 7,701,858 | B2 | 4/2010 | Werb et al. |

(Continued)

FOREIGN PATENT DOCUMENTS

| | | |
|---|---|---|
| EP | 2160042 A1 | 3/2010 |
| JP | 2011-103520 A | 5/2011 |

(Continued)

OTHER PUBLICATIONS

"Wireless systems for industrial automation: Process control and related applications", ISA-100.11a-2009, p. 249-314.

*Primary Examiner* — Michael J Moore, Jr.
*Assistant Examiner* — Gautam Sharma
(74) *Attorney, Agent, or Firm* — Sughrue Mion, PLLC

(57) ABSTRACT

A management apparatus for managing a wireless network includes a storage storing unset communication links other than previously set communication links for a wireless communication via the wireless network among previously prepared communication links and a manager configured to divide each communication link stored in the storage into a plurality of communication links and to set the plurality of communication links in accordance with a setting request of communication links.

17 Claims, 16 Drawing Sheets

(51) Int. Cl.
*H04B 1/7143* (2011.01)
*H04W 72/04* (2009.01)
*H04L 12/24* (2006.01)
*H04W 84/18* (2009.01)

(52) U.S. Cl.
CPC ....... *H04W 72/04* (2013.01); *H04W 72/0446* (2013.01); *H04W 84/18* (2013.01)

(56) References Cited

U.S. PATENT DOCUMENTS

| | | | |
|---|---|---|---|
| 2003/0177263 A1* | 9/2003 | Robinson | H04L 45/00 709/239 |
| 2010/0303038 A1 | 12/2010 | Krohn et al. | |
| 2011/0110291 A1 | 5/2011 | Ishii | |
| 2012/0320812 A1 | 12/2012 | Heinrich | |
| 2013/0100962 A1* | 4/2013 | Shettel | H04L 47/72 370/458 |

FOREIGN PATENT DOCUMENTS

| | | | |
|---|---|---|---|
| JP | 201244697 A | 3/2012 | |
| WO | 2008149420 A1 | 12/2008 | |

\* cited by examiner

MANAGEMENT APPARATUS, MANAGING METHOD, AND WIRELESS COMMUNICATION SYSTEM

TECHNICAL FIELD

The present invention relates to a management apparatus for managing wireless networks, a managing method, and a wireless communication system including the apparatus.

Priority is claimed on Japanese Patent Application No. 2013-033683, filed on Feb. 22, 2013, the contents of which are incorporated herein by reference.

BACKGROUND ART

In order to achieve a high level of automated operation in a plant, a factory, or the like, a distributed control system (DSC) has been implemented, in which on-site devices (measures and actuators), which are referred to as field devices are connected via a communication means to controllers that controls the field devices. Although the communication system that forms the base of such a distributed control system had been almost always one that communicates by cable, ones that communicate wirelessly in conformance with an industrial wireless communication standard such as ISA100.11a or WirelessHART (registered trademark) have been realized in recent years.

The wireless communication system in conformance with these wireless communication standards includes a management apparatus, which is referred to as a system manager (or a network manager), and manages communication resources (channels, time slots, and the like) required to communicate wirelessly via wireless networks. In particular, the management apparatus creates a communication schedule in which different time slots and channels are assigned to wireless communications from each other, which are performed via the wireless network, thereby, manages the wireless communications so as to prevent the overlap of the assignments of the communication resources.

The above-stated distributed control system regularly collects the measured results of field devices and regularly controls (operates) the field devices based on the collected measured results. Therefore, the above-stated management apparatus of the wireless communication system creates a periodical communication schedule by using a communication template, which is referred to as a super frame as shown in FIG. 14 and setting communication links between the wireless devices in the super frame (shadow regions in FIG. 14). FIG. 14 is a diagram for describing the super frame.

The above-stated communication link consists of the following information (1) to (4).

(1) Information specifying the time slot at which the transmittance and reception of the wireless signals is performed.

(2) Information specifying the channel used for the transmittance and reception of the wireless signals.

(3) Information specifying the transmittance or the reception.

(4) Information specifying the super frame to which the communication link belongs.

The information represented by the above-stated (1) consists of information (offset) indicating the amount of deviation from the time slot at the front of the super frame and information (interval) indicating the interval between the time slots during the periodic communication in the super frame.

Each of the following patent references 1 to 3 discloses an example of the above-stated conventional wireless communication system. The following non-patent reference 1 discloses a method for managing communication resources in conformance with the above-stated ISA100.11a.

In the above-stated wireless communication system, for example, when a new wireless device is taken part in a wireless network, the communication link is dynamically set by a management apparatus. When such a new communication link is set, the overlap of the new communication link with the previously set communication link is required to be prevented, but, conventionally, there are some cases where a new communication link cannot be set even if a plurality of empty slots exists and the communication resources are not effectively used.

FIG. 15 is a diagram showing an example of communication links to be set in the super frame. The following four communication links "A" to "D" are set in the example shown in FIG. 15. In FIG. 15, time slots, to which the characters "A" to "D" are assigned, each represent time slots, to which the following communication links "A" to "D" are set, and time slots, to which the characters "A" to "D" are not assigned, represent empty slots. In order to simplify the description, FIG. 15 shows only one assignable channel.

Communication link "A": offset=0, interval=8
Communication link "B": offset=1, interval=4
Communication link "C": offset=3, interval=16
Communication link "D": offset=6, interval=12

When a new communication link having an interval "4" is tried to be set under the condition that the above-stated communication links "A" to "D" have been set, it is found that the new communication link cannot be set even if empty slots exist as shown in FIG. 15. As described above, the case in which a new communication link cannot be set even if empty slots exist is referred to as a "fragmentation" in this description and the like.

The management apparatus in the wireless communication system frequently performs an operation for deleting the previously set communication link and setting a new communication link (resetting a communication link) by the exchange of path, the exchange of bandwidth, and the like. If such a communication link resetting is frequently performed, this progresses the fragmentation of the communication link and increases the probability that the setting of a new communication link will become impossible, and it is likely that the use efficiency of the valuable communication resources are further decreased.

CITATION LIST

Patent Literature

PTL1: U.S. Pat. No. 7,701,858
PTL2: U.S. Pat. No. 7,420,980
PTL3: Japanese Patent Application Laid-Open Publication No. 2011-103520

Non Patent Literature

NPL1: "ISA-100.11a-2009 Wireless systems for industrial automation: Process control and related applications", p. 249-314

SUMMARY OF INVENTION

Technical Problem

One aspect of the present invention provides a management apparatus, a managing method, and a wireless communication system, which enable to prevent the decreasing of use efficiency of communication resources due to the fragmentation of communication links.

Solution to Problem

A management apparatus for managing a wireless network according to one aspect of the present invention may include a storage storing unset communication links other than previously set communication links for a wireless communication via the wireless network among previously prepared communication links and a manager configured to divide each communication link stored in the storage into a plurality of communication links and to set the plurality of communication links in accordance with a setting request of communication links.

In the above-stated management apparatus, priorities in accordance with a previously defined rule may be respectively assigned to the communication links, and when a plurality of communication links suitable for the setting request of communication links are stored in the storage, the manager may be configured to preferentially set one communication link, to which a higher priority is assigned.

In the above-stated management apparatus, when the manager forms a plurality of communication links having a same interval, the manager may be configured to assign a higher priority to each of the plurality of communication links as the priority of the communication link, which is divided to form the plurality of communication links, increases and when the manager repeatedly divides a single communication link to form a plurality of communication links, the manager may be configured to assign a higher priority to each of the plurality of communication links as the interval of each of the plurality of communication links increases.

In the above-stated management apparatus, when there is one communication link, which is setting-cancelled, the manager may be configured to combine the one communication link, which is setting-cancelled, and other communication link stored in the storage and to store the combined communication link into the storage in accordance with one priority assigned to the one communication link, which is setting-cancelled, and other priorities assigned to the communication links stored in the storage.

In the above-stated management apparatus, the manager may be configured to combine one communication link, which is setting-cancelled, and other communication link having a same interval as that of the one communication link, and the one communication link and the other communication link are formed by dividing a single communication link.

In the above-stated management apparatus, when a first communication link combinable with the previously set communication link and a second communication link exchangeable for the previously set communication link are stored in the storage, the manager may be configured to set the second communication link instead of the previously set communication link, to combine the previously set communication link and the first communication link, and to store the combined communication link into the storage.

In the above-stated management apparatus, when a second communication link exchangeable for the previously set communication link and having a priority higher than that of the previously set communication link is stored in the storage, the manager may be configured to set the second communication link instead of the previously set communication link.

In the above-stated management apparatus, the manager may be configured to divide the communication link stored in the storage into a plurality of communication links, each of the plurality of communication links may have a wider interval, and the plurality of communication links may have different offsets from each other.

In the above-stated management apparatus, when the manager divides the communication link having an interval X1 and an offset Y1 into N parts, the manager may be configured to form N communication links and each of the N communication links may have an interval X2 and an offset Y2 represented by the following equation (1):

$$X2 = X1 * N$$

$$Y2 = Y1 + (i * X1) \tag{1}$$

In the equation (1), N is an integer equal to or greater than 2, and the variable i is an integer satisfying $0 \leq i < N$ In the above-stated management apparatus, the manager may determines whether one communication link having a same interval as that requested in the setting request is stored in the storage, when the one communication link having the same interval as that requested in the setting request is stored in the storage, the manager may be configured to set the one communication link stored in the storage, when the one communication link having the same interval as that requested in the setting request is not stored in the storage, the manager may be configured to divide other communication link having an interval smaller than that requested in the setting request among the communication links stored in the storage to form a divided communication link having the same interval as that requested in the setting request and to set the divided communication link.

A wireless communication system for performing a wireless communication via a wireless network according to other aspect of the present invention may include a plurality of wireless devices configured to performing the wireless communication via the wireless network and a management apparatus configured to set a communication link for performing the wireless communication among the wireless devices via the wireless network. The management apparatus may include a storage storing unset communication links other than previously set communication links for the wireless communication via the wireless network among previously prepared communication links and a manager configured to divide each communication link stored in the storage into a plurality of communication links and to set the plurality of communication links in accordance with a setting request of communication links.

In the above-stated wireless communication system, priorities in accordance with a previously defined rule may be respectively assigned to the communication links, when a plurality of communication links suitable for the setting request of communication links are stored in the storage, the manager may be configured to preferentially set one communication link, to which a higher priority is assigned.

In the above-stated wireless communication system, when there is one communication link, which is setting-cancelled, the manager may be configured to combine the one communication link, which is setting-cancelled, and other communication link stored in the storage and to store the combined communication link into the storage in accordance with one priority assigned to the one communication link, which is setting-cancelled, and other priorities assigned to the communication links stored in the storage.

In the above-stated wireless communication system, when a first communication link combinable with the previously set communication link and a second communication link exchangeable for the previously set communication link are stored in the storage, the manager may be configured to set the second communication link instead of the previously set communication link, to combine the previously set communication link and the first communication link, and to store the combined communication link into the storage.

In the above-stated wireless communication system, when a second communication link exchangeable for the previously set communication link and having a priority higher than that of the previously set communication link is stored in the storage, the manager may be configured to set the second communication link instead of the previously set communication link.

In the above-stated wireless communication system, the manager may be configured to divide the communication link stored in the storage into a plurality of communication links, each of the plurality of communication links may have a wider interval, and the plurality of communication links may have different offsets from each other.

A managing method for managing a wireless network according to other aspect of the present invention may include, when a setting request of communication links is input, dividing an unset communication link other than previously set communication links for a wireless communication via the wireless network among previously prepared communication links into a plurality of communication links and setting the plurality of communication links.

In the above-stated managing method, priorities in accordance with a previously defined rule may be respectively assigned to the communication links and when a plurality of communication links suitable for the setting request of communication links are stored in the storage, dividing the unset communication link into the plurality of communication links and setting the plurality of communication links may include preferentially setting one communication link, to which a higher priority is assigned.

The above-stated managing method may include, when there is one communication link, which is setting-cancelled, combining one communication link, which is setting-cancelled, and the unset communication link in accordance with one priority assigned to the one communication link, which is setting-cancelled, and other priority assigned to the unset communication link.

The above-stated managing method may include, when a first communication link combinable with the previously set communication link and a second communication link exchangeable for the previously set communication link are included in the unset communication link, setting the second communication link instead of the previously set communication link and combining the previously set communication link and the first communication link, and when the first communication link is not included in the unset communication link and the second communication link having a priority higher than that of the previously set communication link is included in the unset communication link, setting the second communication link instead of the previously set communication link.

Advantageous Effects of Invention

According to the one aspect of the present invention, among previously prepared communication links, unset communication links other than previously set communication links for wireless communications via wireless networks are stored in a storage, and one communication link stored in the storage is divided into a plurality of communication links and the plurality of communication links are set based on a setting request for communication links. This enables to prevent the decreasing of use efficiency of communication resources due to the fragmentation of communication links.

DESCRIPTION OF EMBODIMENTS

Hereinafter, a management apparatus, a managing method, and a wireless communication system according to an embodiment of the present invention will be described in detail, with reference made to the drawings.

<Overall Constitution of Wireless Communication System>

Figure 1:
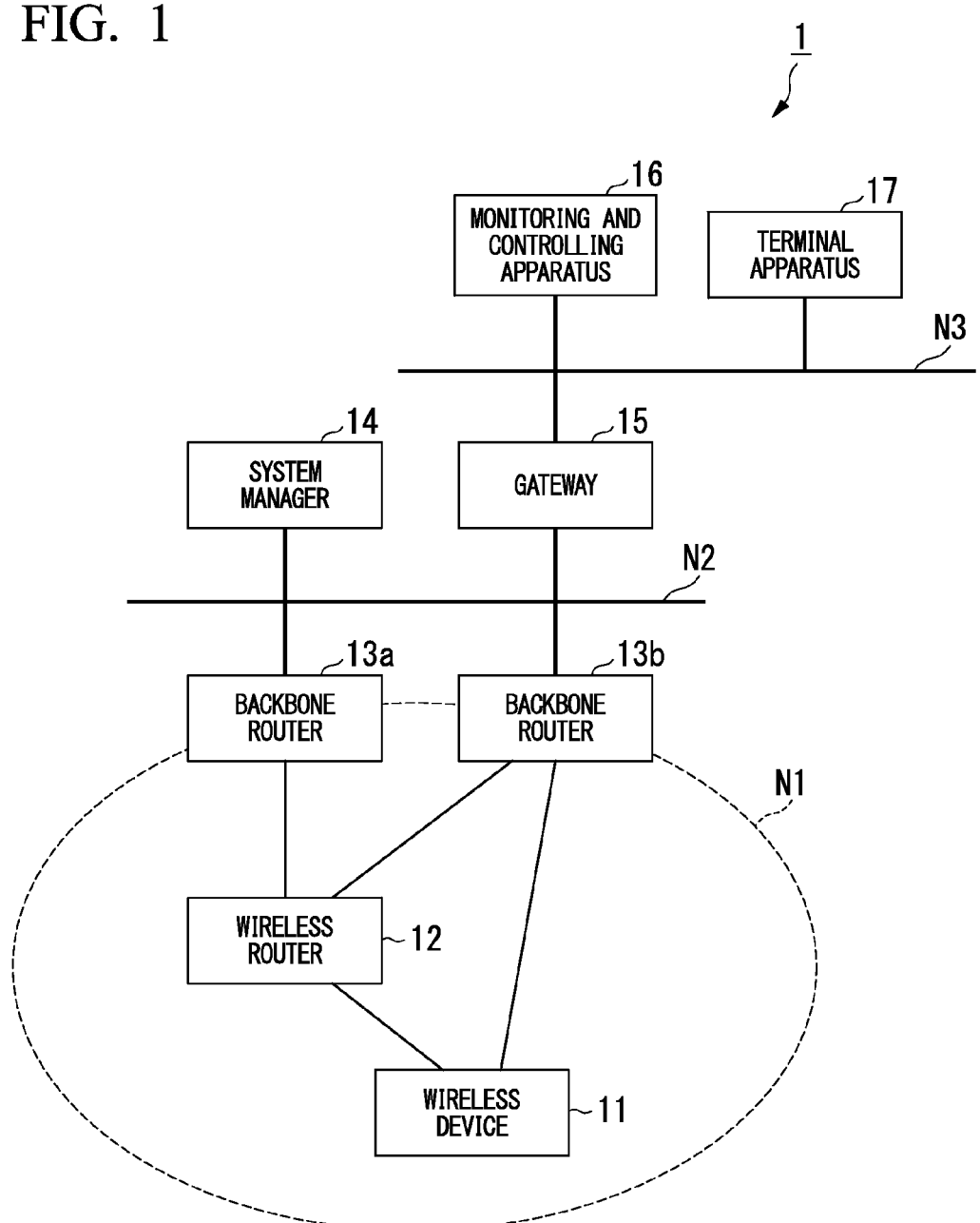
FIG. 1 is a diagram showing the overall constitution of a wireless communication system according to an embodiment of the present invention.

FIG. 1 is a diagram showing the overall constitution of a wireless communication system according to an embodiment of the present invention. As shown in FIG. 1, a wireless communication system 1 according to the embodiment includes a wireless device 11, a wireless router 12, backbone routers 13a and 13b, a system manager 14 (management apparatus), a gateway 15, a monitoring and controlling apparatus 16, and a terminal apparatus 17 and can perform Time Division Multiple Access (TDMA) wireless communication via a wireless network N1. This wireless communication system 1 is constructed in, for example, a plant, a factory or the like (hereinafter, collectively referred to simply as a plant).

The wireless network N1, a backbone network N2, and a control network N3 are provided in the plant in which the wireless communication system 1 is constructed. The wireless network N1 is implemented by devices (the wireless device 11, the wireless router 12, and the backbone routers 13a and 13b) installed on site in the plant and is managed by the system manager 14. The number of each of wireless devices, wireless routers, and backbone routers, which form the wireless network N1, is arbitrary.

The backbone network N2 is a main wired network of the wireless communication system 1 and the backbone routers 13a and 13b, the system manager 14, and the gateway 15 are connected to the backbone network N2. The control network N3 is a wired network positioned higher than the backbone network N2 and the gateway 15, the monitoring and controlling apparatus 16, and the terminal apparatus 17 are connected to the control network N3.

The wireless device 11 includes, for example, a sensor device such as a flow gauge or temperature sensor, a valve device such as a flow rate control valve or open and close value, an actuator device such as a fan or motor, and other field devices installed on the plant, and operates under the control of the monitoring and controlling apparatus 16. This wireless device 11 performs power-saving operations (for example, intermittent operations) using a battery as a power source and can perform a wireless communication adopting the TDMA system in conformance with ISA100.11a. The wireless router 12 performs wireless communication in conformance with ISA100.11a with the wireless device 11 and the backbone routers 13a and 13b and relays data transmitted and received between the wireless device 11 and each of the backbone routers 13a and 13b. This wireless router 12 also performs power-saving operations such as intermittent operations using a battery as a power source in a similar way to the wireless device 11.

The backbone routers 13a and 13b connects the wireless network N1 and the backbone network N2 and relays data transmitted and received between the wireless network N1 and the backbone network N2. Each of these backbone routers 13a and 13b continuously operates using, for example, direct-current power supplied from the backbone network N2 or direct-current power supplied via other path than the backbone network N2 and performs wireless communication in conformance with the above-stated wireless communication standard ISA100.11a.

The system manager 14 continuously operates using electrical power supplied from, for example, a commercial power source and controls the wireless communication performed via the wireless network N1. In particular, the system manager 14 performs an assignment control of communication resources (time-slots and channels) for the wireless device 11, the wireless router 12, the backbone routers 13a and 13b, and the gateway 15 to realize the wireless communication adopting the TDMA system via the wireless network N1. The system manager 14 performs an operation for adding the wireless device 11 and the like to the wireless network N1. The details of the system manager 14 will be described later.

The gateway 15 connects the backbone network N2 and the control network N3 and relays various data transmitted and received between a group of the wireless device 11, the system manager 14 and the like and a group of the monitoring and controlling apparatus 16 and the terminal apparatus 17. Providing the gateway 15 enables the backbone network N2 and the control network N3 to be connected to each other while maintaining the security.

The monitoring and controlling apparatus 16 monitors and manages the wireless device 11 and the like. In particular, the monitoring and controlling apparatus 16 collects measured data (for example, flow rate value) from the wireless device 11 via the gateway 15 to monitor the wireless device 11 and the like. The monitoring and controlling apparatus 16 calculates control amount (for example, a valve opening degree of a valve device) based on the collected measured data and sets the control amount to the wireless device 11 via the gateway 15 to control the wireless device 11.

The terminal apparatus 17 is operated by, for example, an operator in the plant and used to perform the monitoring and control of the wireless device 11 and the like. In particular, the terminal apparatus 17 includes an input device such as a keyboard and a pointing device and a display device such as a liquid crystal display device, displays the monitored results of the wireless device 11, which have been obtained by the monitoring and controlling apparatus 16, on the display device to provide the monitored results to the operator, outputs, to the monitoring and controlling apparatus 16, instructions input by the operator's operation of the input device, and makes the monitoring and controlling apparatus 16 perform the control in accordance with the instructions.

<Constitution of System Manager 14>

Figure 2:
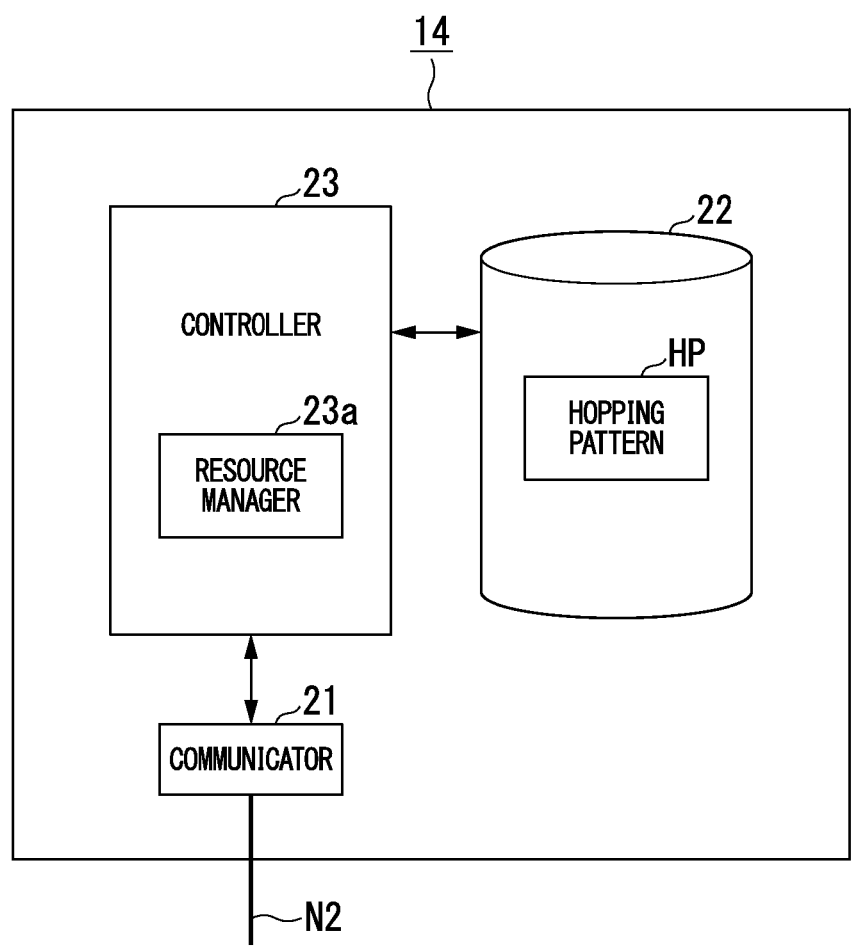
FIG. 2 is a block diagram showing the main parts of the constitution of a system manager, which acts as a management apparatus, according to the embodiment of the present invention.

FIG. 2 is a block diagram showing the main parts of the constitution of the system manager, which acts as a management apparatus, according to the embodiment of the present invention. As shown in FIG. 2, the system manager 14 includes a communicator 21, a storage 22, and a controller 23. The communicator 21 is connected to the backbone network N2 and performs communication via the backbone network N2 under the control of the controller 23.

The storage 22 is realized by, for example, an internal storage device such as a semiconductor memory or an external storage device such as a hard disk and stores communication resources such as communication links required to perform wireless communications via the wireless network N1. In particular, among previously prepared communication links as hopping patterns HP, the storage 22 stores unset communication links other than previously set communication links for the wireless communications via the wireless network N1.

The above-stated hopping patterns HP define channel transition rules when the wireless communications are performed via the wireless network N1 and are the most fundamental communication links used for the wireless communication system 1. This hopping patterns HP are formed by, for example, designers of the wireless communication system 1 and are stored in the storage 22 before shipment of the system manager 14. The details will be described later, but all communication links to be set by the wireless communication system 1 are formed from these hopping patterns HP. When the setting of the communication link is not performed (the number of the set communication links is equal to zero), the hopping patterns are stored in the storage 22.

Figure 3:
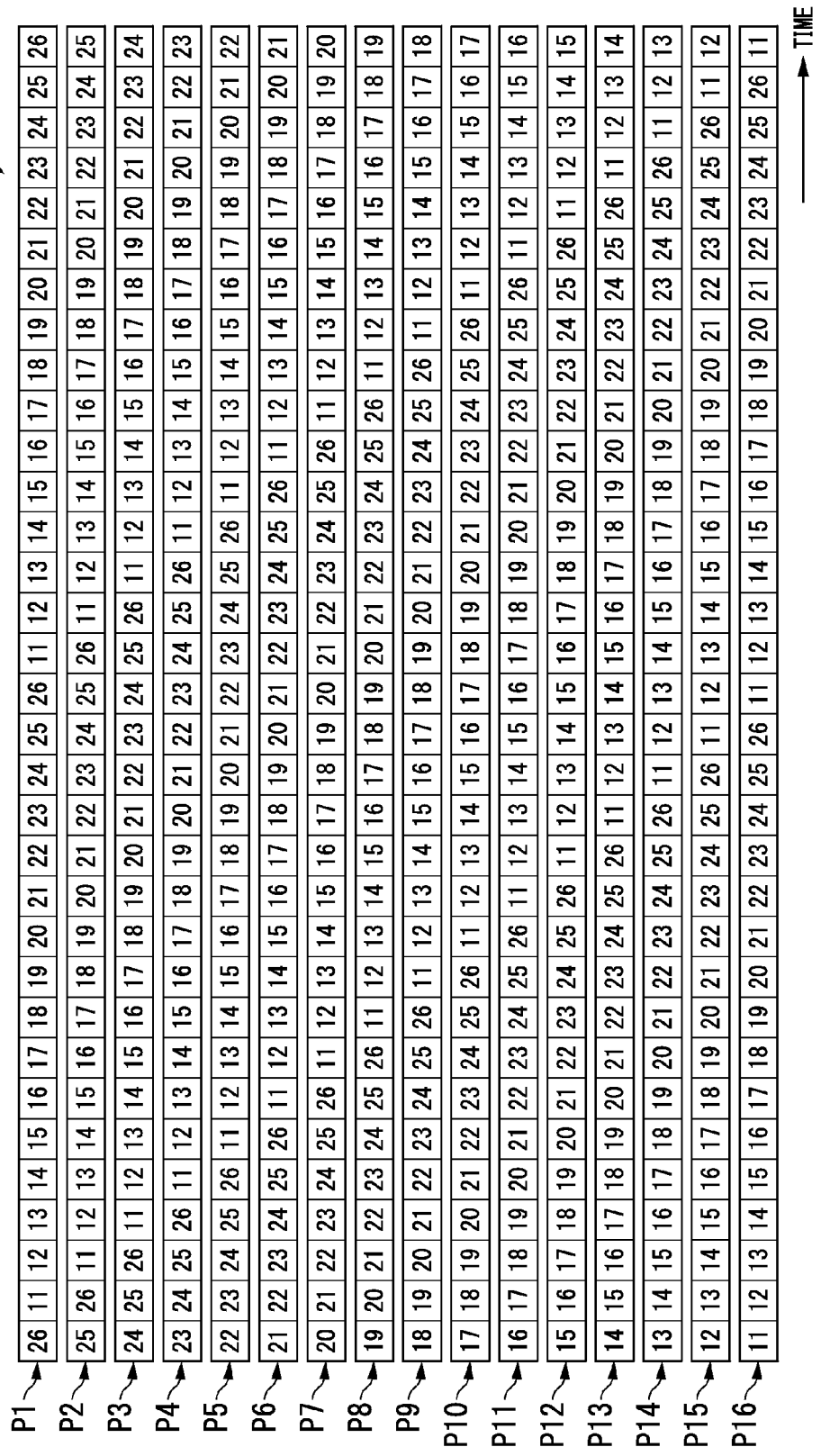
FIG. 3 is a diagram showing an example of hopping patterns stored in the system manager which does not set a communication link.

FIG. 3 is a diagram showing an example of hopping patterns stored in the system manager which does not set communication links. The hopping pattern HP shown in FIG. 3 is a pattern when the number of the channels used in the wireless communication system 1 is equal to "16". One square shown in the figure represents one time slot (for example, 10 [ms]) and numerical numbers from "11" to "26", each of which is listed in each square, represent 16 channels (11ch to 26ch) used in each time slot, respectively.

The hopping patterns shown in FIG. 3 consist of 16 hopping patterns P1 to P16. As shown in FIG. 3, each of the hopping patterns P1 to P16 defines the transition rule of channels in each time slot. For example, the hopping pattern P1 represents that a channel used in an initial time slot is "26ch", channels used in the subsequent 16 time slots are "11ch" to "26ch", and channels "11ch" to "26ch" are used in each set of the subsequent 16 time slots. Therefore, it can be said that the hopping patterns P1 to P16 are 16 kinds of communication links, each of which has the offset "0" and the interval "1".

The controller 23 overall controls the operation of the system manager 14. For example, in order to realize the wireless communication adopting the TDMA system via the wireless network N1, the controller 23 sets the communication links for the wireless devices for performing the wireless communication via the wireless network N1 (the wireless device 11, the wireless router 12, and the backbone routers 13a and 13b) and the gateway 15. When there is a join request for the wireless network N1, the controller 23 performs a process for adding the wireless device, which has performed the join request, to the wireless network N1.

The controller 23 includes a resource manager 23a (manager) for setting the above-stated communication links. This resource manager 23a reads, from the storage 22, a communication link suitable for the setting request of communication links from the controller 23 and sets it. When the communication link suitable for the setting request of communication links from the controller 23 (in particular, the communication link having an interval, which is equal to or close to the requested interval) is not stored in the storage 22, the resource manager 23a divides the communication link stored in the storage 22 into a plurality of communication links (the plurality of communication links suitable for the setting request of communication links from the controller 23) and sets them.

Figure 4A:
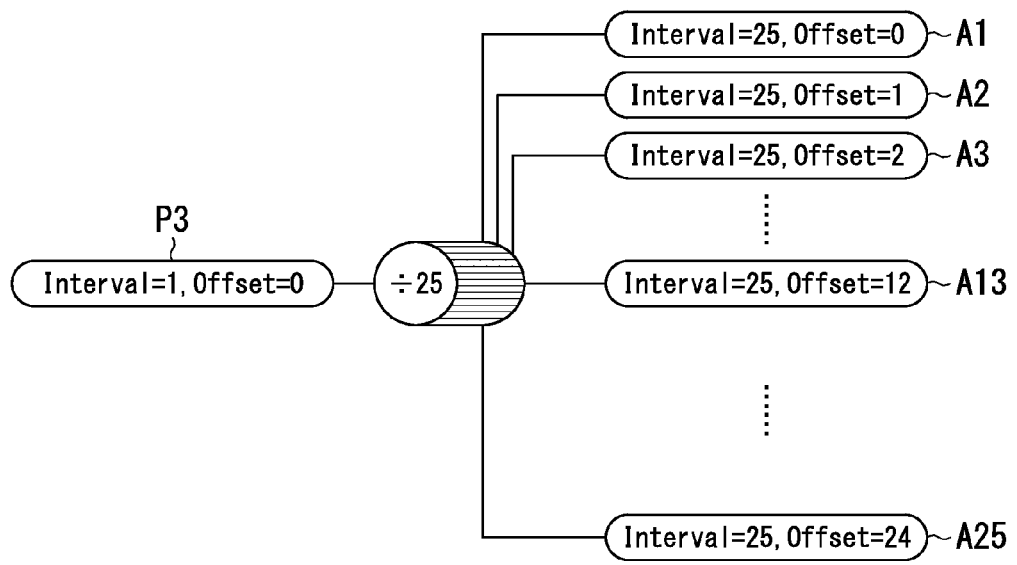
FIG. 4A is a diagram describing an example of division processes of communication resources performed by a resource manager in the system manager.
Figure 4B:
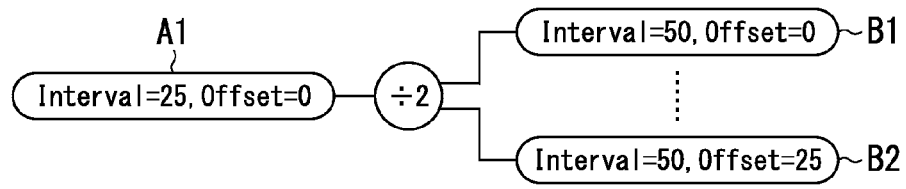
FIG. 4B is a diagram describing an example of division processes of communication resources performed by the resource manager in the system manager.

Each of FIGS. 4A and 4B is a diagram describing an example of division processes of communication resources performed by the resource manager in the system manager. In FIGS. 4A and 4B, a description will be provided for an example in which the hopping pattern P3 shown in FIG. 3 is divided. As stated above, it can be said that each of the hopping patterns P1 to P16 is a communication link having the offset "0" and the interval "1". Therefore, in FIG. 4A, the hopping pattern P3 is shown as the communication link having the offset "0" and the interval "1".

As shown in FIG. 4A, the resource manager 23a divides the hopping pattern P3 into 25 parts (the interval is enlarged) to provide 25 communication links A1 to A25, each of which has the interval "25" and the different offset from each other (the offsets are "0" to "24"). In other words, when the time slot is 10 [ms], 25 kinds of communication links A1 to A25, each of which has the cycle 250 [ms], are obtained by performing the above-stated division.

The communication link A1 transits in the order of the channel "24ch" of the initial time slot (zeroth time slot) of the hopping pattern P3 shown in FIG. 3, the channel "17ch" of the twenty-fifth time slot, . . . . The communication link A2 transits in the order of the channel "25ch" of the first time slot of the hopping pattern P3 shown in FIG. 3, the channel "18ch" of the twenty-sixth time slot, . . . . Similarly, the communication link A3 transits in the order of the channel "26ch" of the second time slot of the hopping pattern P3 shown in FIG. 3, the channel "19ch" of the twenty-seventh time slot, . . . . Other communication links A4 to A25 transit according to the similar rule.

The resource manager 23a can divide, not only the hopping pattern P1 to P16, but also communication links obtained by dividing each of the hopping pattern P1 to P16. For example, as shown in FIG. 4B, when the resource manager 23a divides the communication link A1 into 2 parts, two communication links B1 and B2, which have the interval "50" and have different offsets from each other (offsets "0" and "25") are obtained. In other words, the two kinds of communication links B1 and B2, each of which has the cycle of 500 [ms], are obtained by performing the above-stated division.

When the resource manager 23a divides the hopping pattern or communication link having the interval "X1" and the offset "Y1" into N parts (N is an integer equal to or greater than 2), N communication links, each of which has the interval "X2" and the offset "Y2" represented by the following equation (1), are obtained. The variable i used in the following equation (1) is an integer, which satisfies $0 \leq i < N$.

$$X2 = X1 * N$$

$$Y2 = Y1 + (i * X1) \qquad (1)$$

Figure 5:
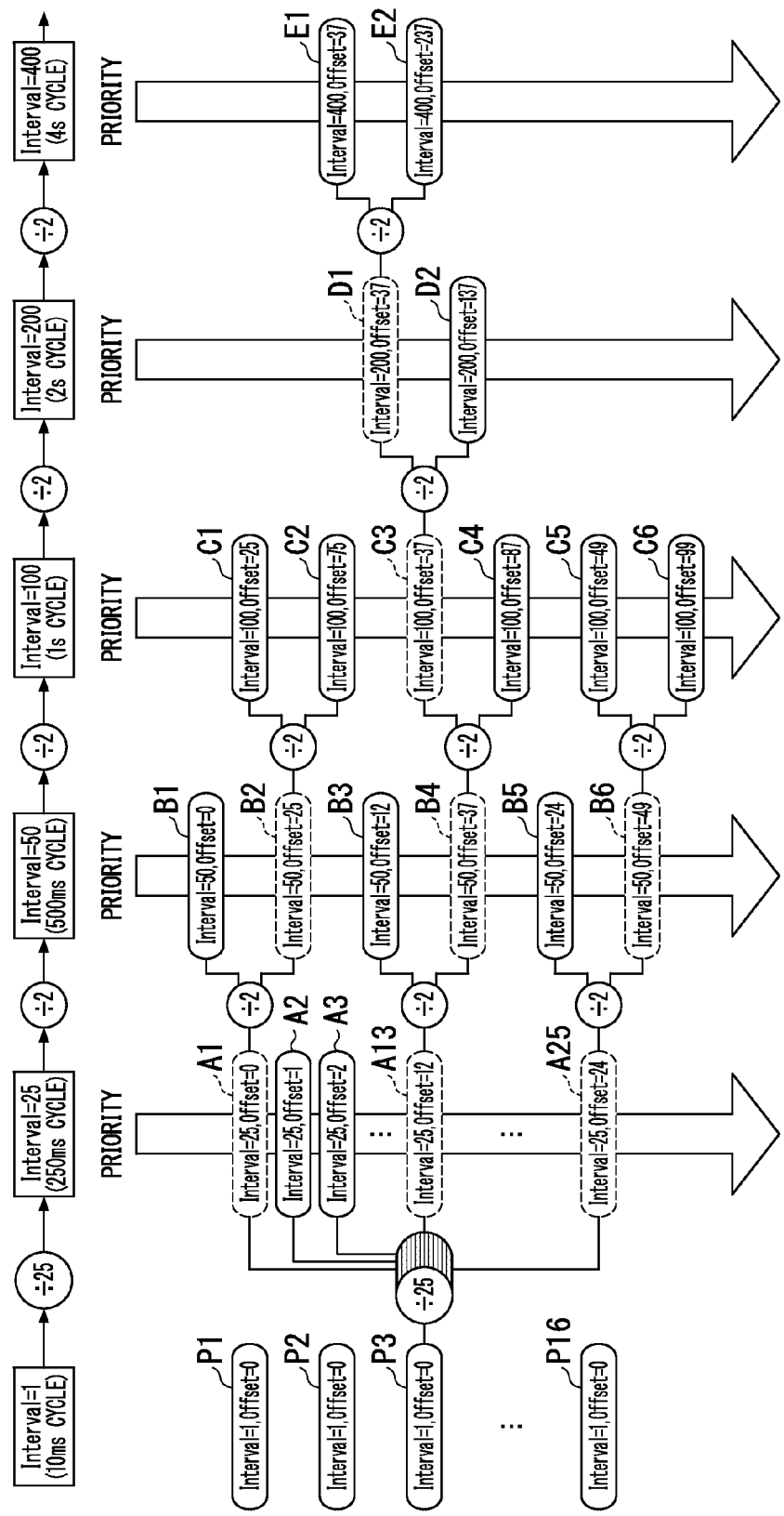
FIG. 5 is a diagram showing an example of communication resources obtained by the division process, which is performed by the resource manager in the system manager.

FIG. 5 is a diagram showing an example of communication resources obtained by the division process, which is performed by the resource manager in the system manager. The communication resources shown in FIG. 5 are obtained by dividing the hopping pattern P3 into 25 parts and repeatedly dividing each of the 25 parts into two parts. By performing such a division, communication links A1 to A25 having the cycle 250 [ms] (the interval is "25"), communication links B1 to B6 having the cycle 500 [ms] (the interval is "50"), communication links C1 to C6 having the cycle 1 [s] (the interval is "100"), communication links D1 and D2 having the cycle 2 [s] (the interval is "200"), and communication links E1 and E2 having the cycle 4 [s] (the interval is "400") are formed. Further division enables to form communication links having longer cycle. The division number of the hopping pattern is previously set in the controller 23. Other division numbers than the division numbers in the above-stated example (the division numbers are "25" and "2") can be set in the controller 23.

In FIG. 5, in order to facilitate the understanding, the communication links, which are divided, (the communication links A1, A13, A25, B2, B4, B6, C3, and D1 represented by dash lines) are also shown, but the communication links, which are divided, do not exist. Therefore, it should be noted that, among the communication links shown in FIG. 5, the communication links A2, A3, B1, B3, B5, C1, C2, C4 to C6, D2, E1, and E2 represented by solid lines are stored in the storage 22. The hopping pattern P3, which is divided, is also not stored in the storage 22.

A priority is previously assigned to each of the above-stated hopping patterns P1 to P16. In particular, the priorities, which increase in the order of the hopping patterns P1 to P16, are previously assigned to the hopping patterns P1 to P16, respectively. When the resource manager 23*a* divides each of the hopping patterns P1 to P16 and generates communication links, the resource manager 23*a* assigns priorities in accordance with a previously defined rule. In particular, as the priority, which is assigned to the hopping pattern to be divided into communication links, increases, the resource manager 23*a* assigns a higher priority to the communication links, and as the interval of each communication link increases, the resource manager 23*a* assigns a higher priority to the communication link. In other words, when the resource manager 23*a* forms a plurality of communication links having the same interval, as the priority, which is assigned to the communication link to be divided into the plurality of communication links, increases, the resource manager 23*a* assigns higher priority to the communication links, and when the resource manager 23*a* repeatedly divides one communication link to form a plurality of communication links, as the interval of each communication link increases, the resource manager 23*a* assigns a higher priority to the communication link.

For example, when the resource manager 23*a* divides the communication link, to which a priority "Z1" is assigned, into N parts, the resource manager 23*a* assigns a priority "Z2" obtained using the following equation (2) to each of the divided communication links. A variable n used in the following equation (2) is a bit number equal to or greater than the minimum bit number required to represent the division number (N) by a binary number and a variable j is an integer to specify the divided communication links (integer satisfying 0≤j<N). An operator "<<" used in the following equation (2) is a shift operator.

$$Z2=(Z1<<n)+j \quad (2)$$

Figure 6:
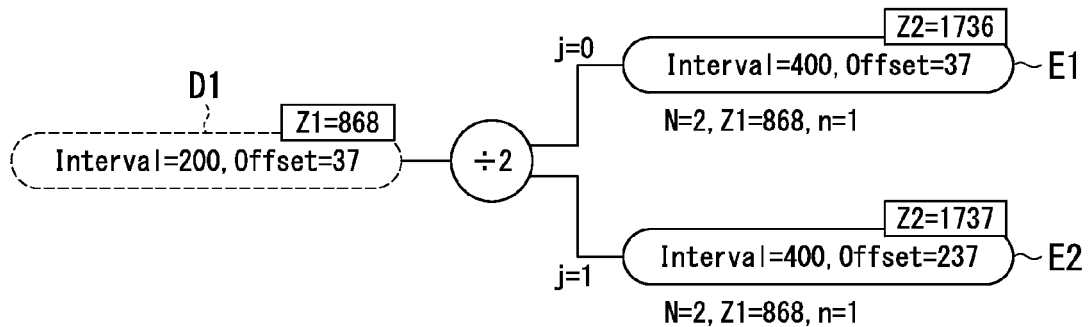
FIG. 6 is a diagram describing an example of priorities, which are assigned to the communication links by the resource manager in the system manager.

FIG. 6 is a diagram describing priorities, which are assigned to the communication link by the resource manager in the system manager. In FIG. 6, a description will be provided for an example of priorities, which are assigned to communication links E1 and E2 formed by dividing the communication link D1 shown in FIG. 5. As shown in FIG. 6, since the priority assigned to the communication link D1 is "868", Z1=868. Since this communication link D1 is divided into the two communication links E1 and E2, N=2. As shown in FIG. 6, since the divided communication links E1 and E2 are specified by setting the valuable j to "0" and "1", respectively, n=1. The resource manager 23*a* assigns a priority having the value of "1736" to the communication link E1 and assigns a priority having the value of "1737" to the communication link E2 using the above-stated equation (2).

When the resource manager 23*a* receives a setting request of communication links from the controller 23 and a plurality of communication links suitable for the setting request (communication links having the same interval as the requested interval) are stored in the storage 22, the resource manager 23*a* preferentially sets a communication link, to which a higher priority is assigned (in the example of FIG. 6, the communication link E2 is set). This is to prevent the fragmentation of communication links.

When there is a communication link, which is setting-cancelled, the resource manager 23*a* combines the communication link, which is setting-cancelled, and the communication link stored in the storage 22 and stores the combined communication link into the storage in accordance with the priority assigned to the communication link, which is setting-cancelled, and the priority assigned to the communication link stored in the storage 22. Communication links have the property that communication links, which have been generated by dividing a single communication link and have the same interval, can be combined, but one divided communication link, which has been generated by dividing one communication link, cannot be combined with other divided communication link, which has been generated by dividing other communication link than the one communication link, and communication links, which have different intervals from each other, cannot be combined. For example, in the example shown in FIG. 5, the communication link C1 can be combined with only the communication link C2 and cannot be combined with the communication link C5 or the communication link D2. As described using FIG. 6, since the priorities having values close to each other are assigned to the communication links, which have been generated by dividing a single communication link and have the same interval, the resource manager 23*a* performs the above-stated combination with reference to the priorities assigned to the communication links and the like.

The resource manager 23*a* performs the defragmentation of communication links under the control of the controller 23. The defragmentation of the communication links means a process for combining combinable communication links as far as possible to prevent the fragmentation of communication links. The defragmentation of communication links is roughly divided into a process for exchanging and combining the previously set communication links to prevent the fragmentation and a process for only exchanging the previously set communication links to prevent the fragmentation.

In particular, in the process for exchanging and combining the previously set communication links, firstly, the resource manager 23*a* determines whether a communication link (first communication link), which is combinable with the previously set communication link (set communication link), and a communication link (second communication link), which is exchangeable for the set communication link, are stored in the storage 22. If the resource manager 23*a* determines that both the first communication link and the second communication link are stored in the storage 22, the resource manager 23*a* combines the set communication link and the first communication link and stores the combined communication link into the storage 22 with setting the second communication link instead of the set communication link.

In the process for only exchanging the previously set communication links, firstly, the resource manager 23*a* determines whether a communication link (first communication link), which is combinable with the previously set communication link (set communication link) is not stored in the storage 22 and a communication link (second communication link), which is exchangeable for the set communication link and has higher priority than that of the set communication link, is stored in the storage 22. When the resource manager 23a determines that the first communication link is not stored in the storage 22 and the second communication link is stored in the storage 22, the resource manager 23a sets the second communication link instead of the set communication link.

<Operations of Wireless Communication System>

Next, the operations of the wireless communication system 1 having the above-stated configuration will be described. Hereinafter, a description will be mainly provided for an operation where the resource manager 23a in the system manager 14 sets a communication link to a wireless device (the wireless device 11, the wireless router 12, and the backbone routers 13a and 13b), which communicates via the wireless network N1. The operations of the system manager 14 are roughly divided into an operation for newly setting a communication link (communication link setting operation), an operation for cancelling the previously set communication link (communication link cancellation operation), and an operation for performing a defragmentation (defragmentation operation). Hereinafter, these operations will be described in turn.

<<Communication Link Setting Operation>>

Figure 7:
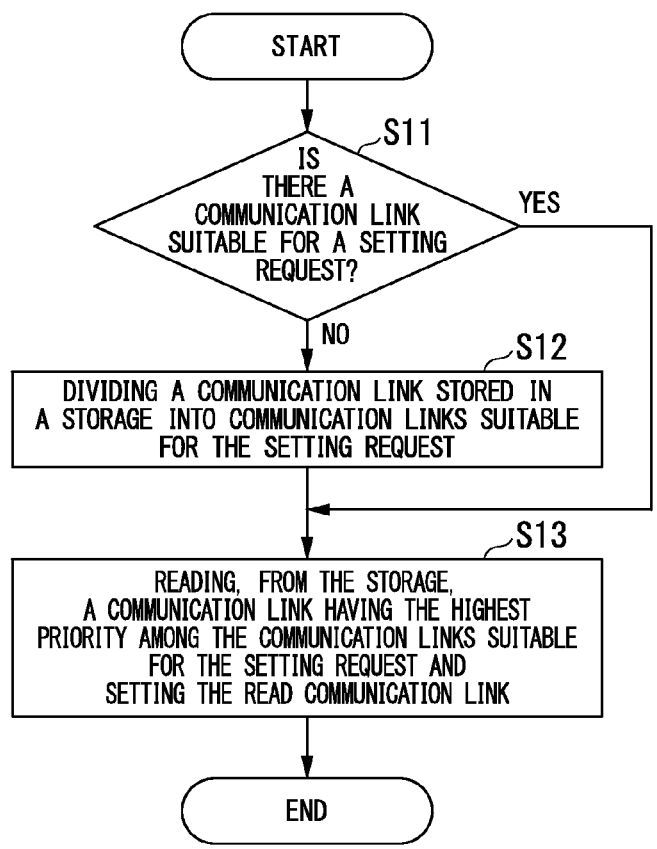
FIG. 7 is a flow chart showing an example of communication link setting operations, which are performed by the system manager.

FIG. 7 is a flow chart showing a communication link setting operation, which is performed by the system manager, and each of FIGS. 8A to 8D is a diagram describing a communication link setting operation performed by the system manager. The flow chart shown in FIG. 7 is started every time the controller 23 in the system manager 14 performs a setting request of communication links to the resource manager 23a.

When the operation is started, firstly, the resource manager 23a determines whether a communication link suitable for the setting request performed by the controller 23 is stored in the storage 22 (step S11). In particular, the resource manager 23a determines whether a communication link having the same interval as an interval, which is indicated by the setting request performed by the controller 23, is stored in the storage 22. When the resource manager 23a determines that the communication link suitable for the setting request is stored in the storage 22 (the determination result in the step S11 is "YES"), the resource manager 23a reads a communication link having the highest priority among the communication links suitable for the setting request from the storage 22 and sets the read communication link (step S13).

On the other hand, when the resource manager 23a determines that a communication link suitable for the setting request is not stored in the storage 22 (the determination result in the step S11 is "NO"), the resource manager 23a performs a process for dividing the communication link stored in the storage 22 into communication links suitable for the setting request and storing the divided communication links into the storage 22 (step S12). Next, the resource manager 23a performs a process for reading, from the storage 22, a communication link having the highest priority among the communication links stored in the storage 22 (the communication links suitable for the setting request) and setting the read communication link (step S13).

Figure 8A:
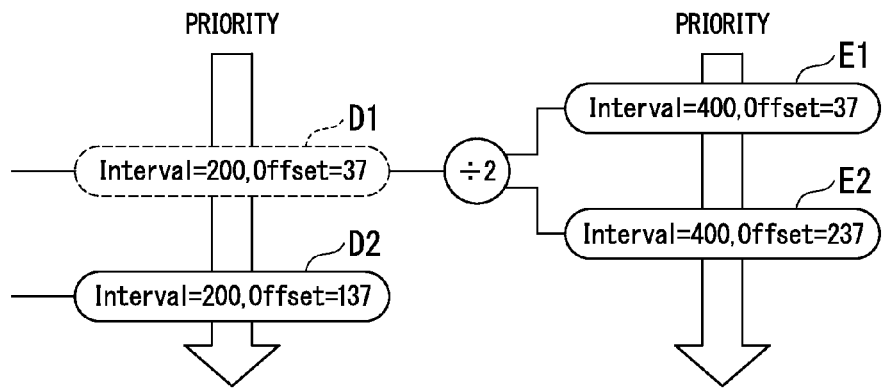
FIG. 8A is a diagram describing an example of a communication link setting operations, which are performed by the system manager.

The case will be considered where, under the condition that the communication links shown in FIG. 5 are stored in the storage 22, the controller 23 in the system manager 14 performs a setting request of a communication link having the interval "400" (the communication link having the cycle 4 [s]) to the resource manager 23a three times consecutively. As shown in FIG. 8A, before the controller 23 performs the setting request, the communication link D2 having the interval "200" and the communication links E1 and E2 having the interval "400" are stored in the storage 22.

Figure 8B:
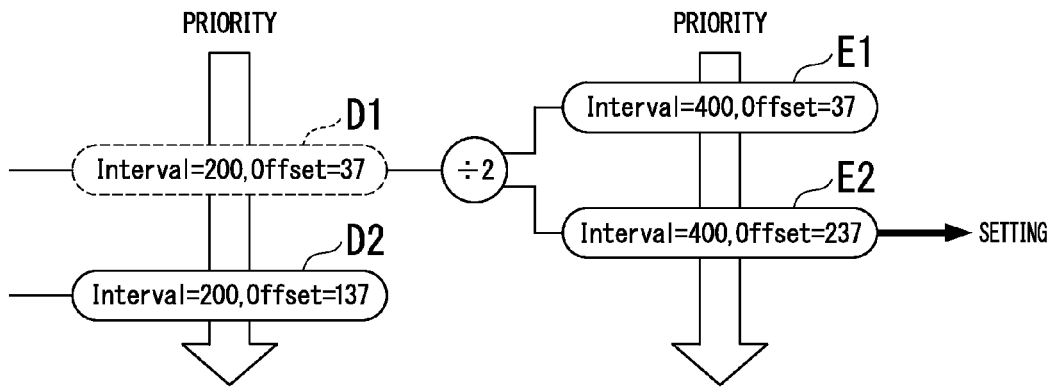
FIG. 8B is a diagram describing an example of a communication link setting operations, which are performed by the system manager.

Firstly, at the time when the controller 23 performs the first setting request, the two communication links having the interval "400" (the communication links E1 and E2) are stored in the storage 22. Therefore, the determination result in the step S11 in FIG. 7 is "YES", and the resource manager 23a performs a process for reading a communication link having the highest priority from the storage 22 and setting the read communication link (the process of step S13). Since the priority higher than that of communication link E1 is assigned to the communication link E2, the communication link E2 is read from the storage 22 and set as shown in FIG. 8B.

Figure 8C:
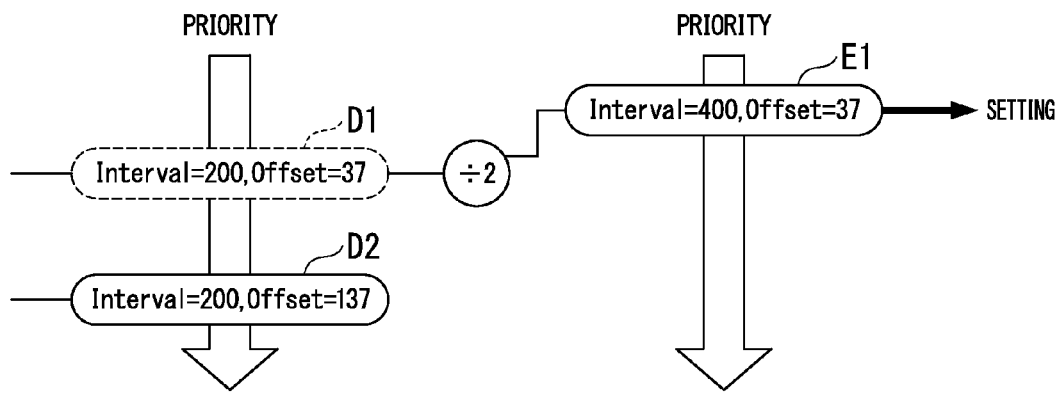
FIG. 8C is a diagram describing an example of a communication link setting operations, which are performed by the system manager.

Next, at the time when the controller 23 performs the second setting request, the communication link having the interval "400" (the communication link E1) is stored in the storage 22. Therefore, the determination result in the step S11 in FIG. 7 is "YES" again, and the resource manager 23a performs the process of the step S13 to read the communication link E1 from the storage 22 and to set the communication link E1 as shown in FIG. 8C.

Subsequently, at the time when the controller 23 performs the third setting request, the communication link having the interval "400" is not stored in the storage 22. Therefore, the determination result in the step S11 in FIG. 7 is "NO", and the resource manager 23a performs a process for dividing the communication link stored in the storage 22 into communication links suitable for the setting request (communication links having the interval "400") (the process of step S12). In particular, the process for dividing the communication link D2 having the interval "200" into two communication links E3 and E4, each of which has the interval "400" (refer to FIG. 8D). If a plurality of communication links exist, each of which is the division target and has the interval "200", the process for dividing one communication link, to which the highest priority is assigned, is performed.

Figure 8D:
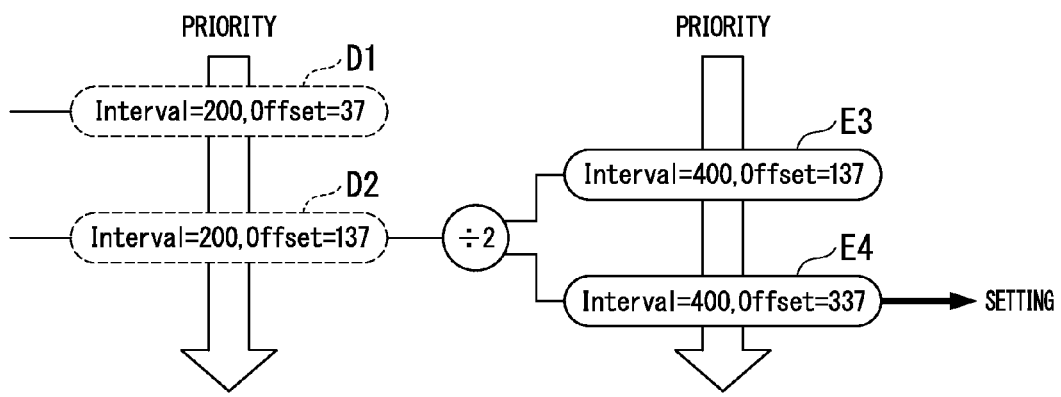
FIG. 8D is a diagram describing an example of a communication link setting operations, which are performed by the system manager.

After the above-stated division process is finished, among the two communication links (the communication links E3 and E4), each of which has the interval "400", the resource manager 23a performs the process for reading one communication link having the highest priority from the storage 22 and setting the one communication link (the process of the step S13). Since the priority higher than that of communication link E3 is assigned to the communication link E4, the communication link E4 is read from the storage 22 and set as shown in FIG. 8D. If the setting of communication link using the hopping pattern P3 progresses and a communication link suitable for the setting request cannot be formed by the process for dividing the hopping pattern P3, the setting of communication link using the hopping pattern P2 having the second highest priority next to the hopping pattern P3 among the hopping patterns P1 to P16 is performed.

<<Communication Link Cancellation Operation>>

Figure 9:
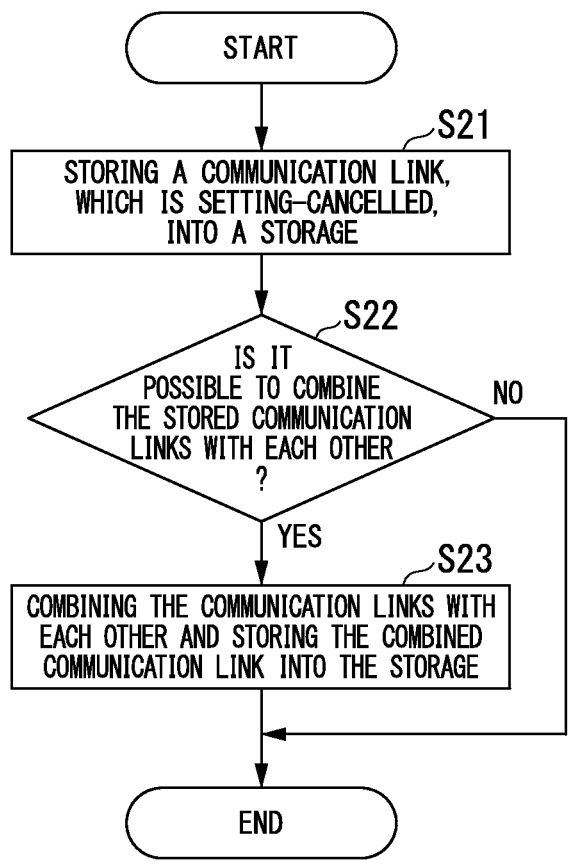
FIG. 9 is a flow chart showing an example of cancellation operations of communication links, which is performed by the system manager.

FIG. 9 is a flow chart showing a cancellation operation of communication links, which is performed by the system manager, and each of FIGS. 10A to 10D is a diagram describing the cancellation operation of communication links, which is performed by the system manager. The flow chart shown in FIG. 9 is started every time the cancellation notification of communication links (the notification for notifying that the set communication link has been cancelled) from the controller 23 in the system manager 14 to the resource manager 23a is performed.

When the process is started, firstly, the resource manager 23a performs a process for storing the communication link subjected to the cancellation notification into the storage 22 (step S21). Next, the resource manager 23a determines whether the communication link stored in the storage 22 in the step S21 is combinable (step S22). In particular, the resource manager 23a determines whether the communication link stored in the storage 22 in the step S21 is combinable with reference to the priority assigned to the communication link and the like.

When the resource manager 23a determines that the combination of the communication resource is possible (the determination result in the step S22 is "YES"), the resource manager 23a performs a process for combining the communication links and storing the combined communication link into the storage 22 (step S23). After such a combination process is finished, the series of processes shown in FIG. 9 are finished. On the other hand, when the resource manager 23a determines that the combination of the communication resource is impossible (the determination result in the step S22 is "NO"), the resource manager 23a does not perform the combination process and the series of processes shown in FIG. 9 are finished.

The case will be considered where, after the setting of the communication link E4 described using FIG. 8D, the controller 23 in the system manager 14 performs the cancellation notifications of the set communication links E1, E2, and E4 to the resource manager 23a in turn. Before the controller 23 performs the cancellation notification, the communication link E3 having the interval "400" is stored in the storage 22 and the communication links D1, D2 and the communication link E4 are not stored in the storage 22 as shown in FIG. 8D.

Figure 10A:
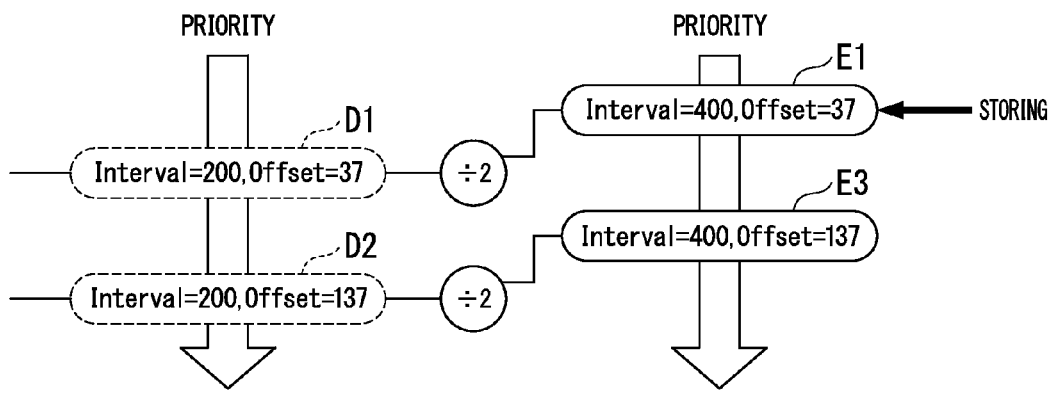
FIG. 10A is a diagram describing an example of cancellation operations of communication links, which are performed by the system manager.

Firstly, when the controller 23 performs the cancellation notification of the communication link E1, the resource manager 23a performs a process for storing the communication link E1 subjected to the cancellation notification into the storage 22 (the process of the step S21) as shown in FIG. 10A. As shown in FIG. 10A, since the communication link E2, which is combinable with the communication link E1, is not stored in the storage 22, the determination result in the step S22 in FIG. 9 is "NO" and the series of the processes shown in FIG. 9 are finished.

Figure 10B:
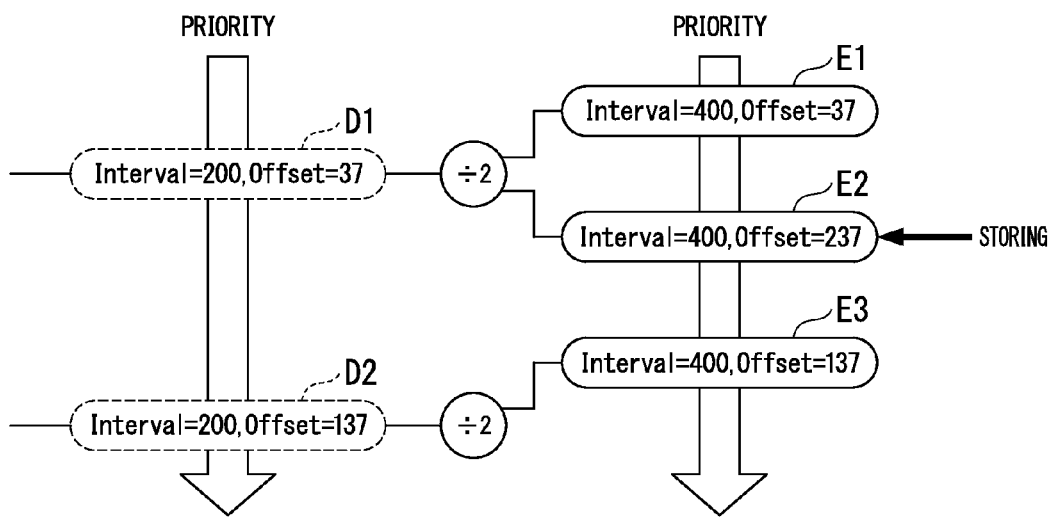
FIG. 10B is a diagram describing an example of cancellation operations of communication links, which are performed by the system manager.

Next, when the controller 23 performs the cancellation notification of the communication link E2, the resource manager 23a performs a process for storing the communication link E2 subjected to the cancellation notification into the storage 22 (the process of the step S21) as shown in FIG. 10B. As shown in FIG. 10B, since the communication link E2, which is combinable with the communication link E1, is stored in the storage 22, the determination result in the step S22 in FIG. 9 is "YES" and the process of the step S23 is performed by the resource manager 23a. Thereby, the communication links E1 and E2 are combined to form the communication link D1 and the combined communication link D1 is stored in the storage 22 (refer to FIG. 10C).

Figure 10C:
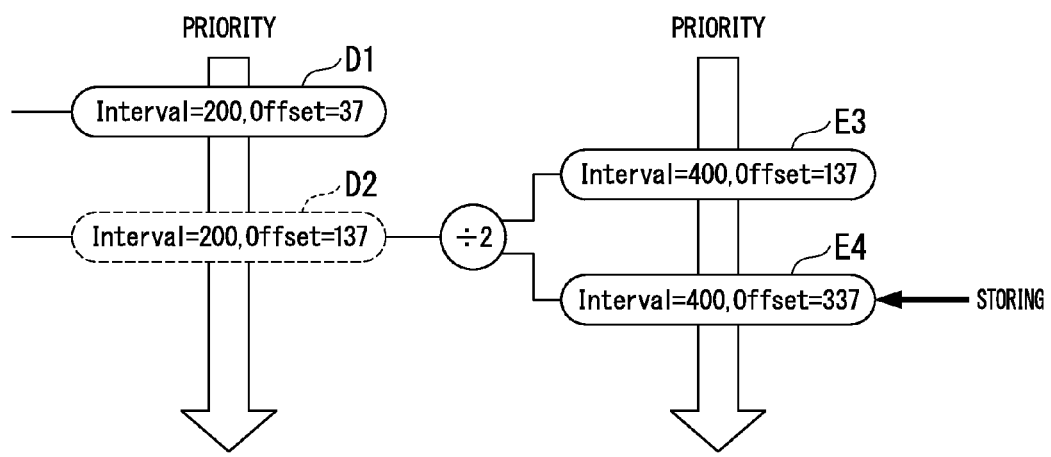
FIG. 10C is a diagram describing an example of cancellation operations of communication links, which are performed by the system manager.
Figure 10D:
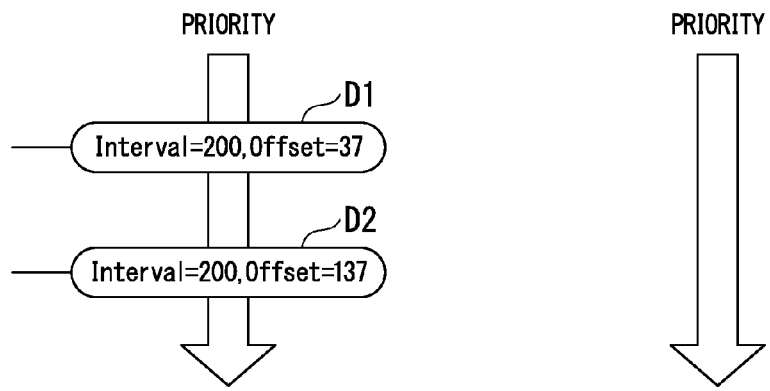
FIG. 10D is a diagram describing an example of cancellation operations of communication links, which are performed by the system manager.

Subsequently, when the controller 23 performs the cancellation notification of the communication link E4, the resource manager 23a performs a process for storing the communication link E4 subjected to the cancellation notification into the storage 22 (the process of the step S21) as shown in FIG. 10C. As shown in FIG. 10C, since the communication link E4, which is combinable with the communication link E3, is stored in the storage 22, the determination result in the step S22 in FIG. 9 is "YES" and the process of the step S23 is performed by the resource manager 23a. Thereby, the communication links E3 and E4 are combined to form the communication link D2 and the combined communication link D2 is stored in the storage 22 as shown in FIG. 10D.

<<Defragmentation Operation>>

Figure 11:
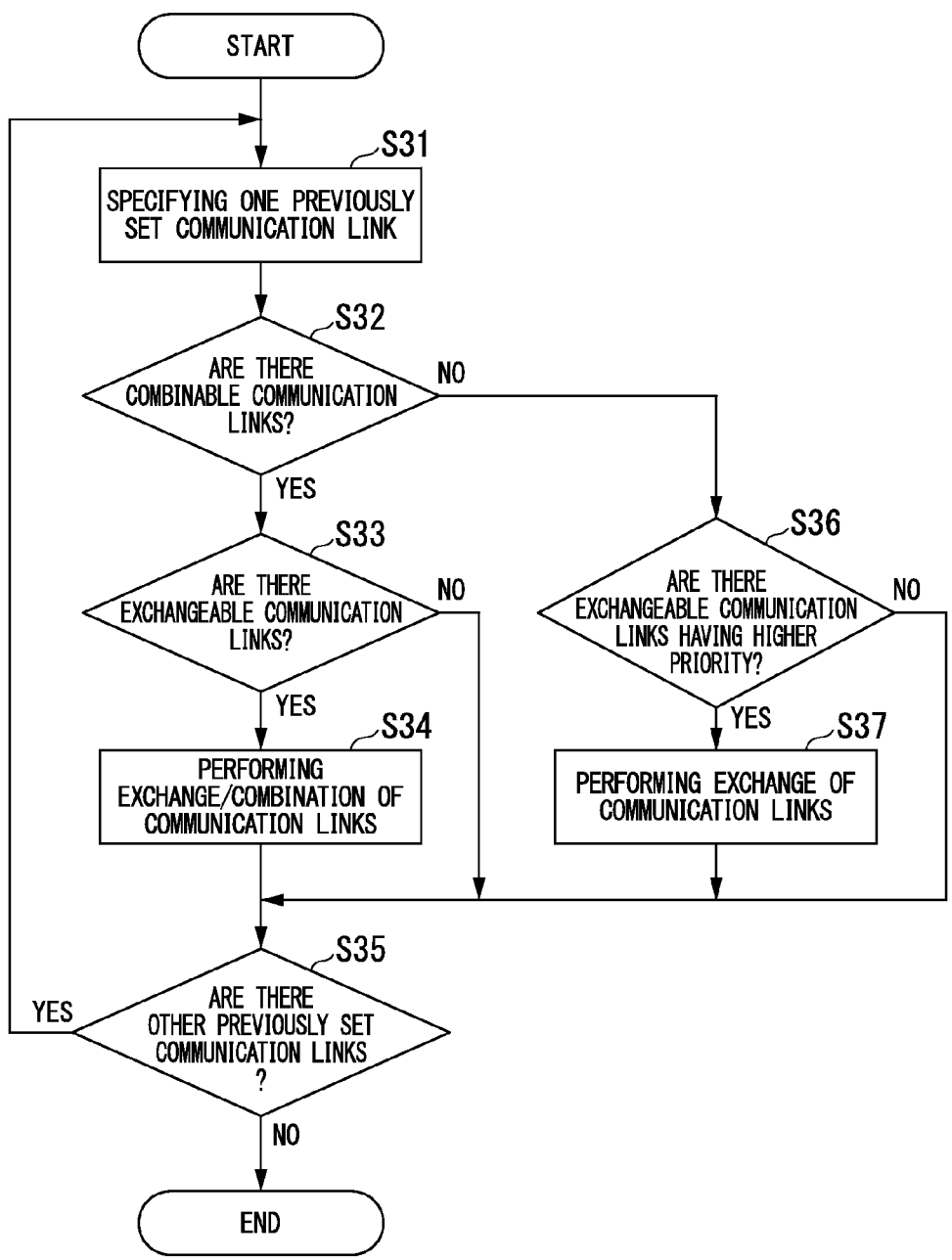
FIG. 11 is a flow chart showing an example of a defragmentation operation, which is performed by the system manager.
Figure 12A:
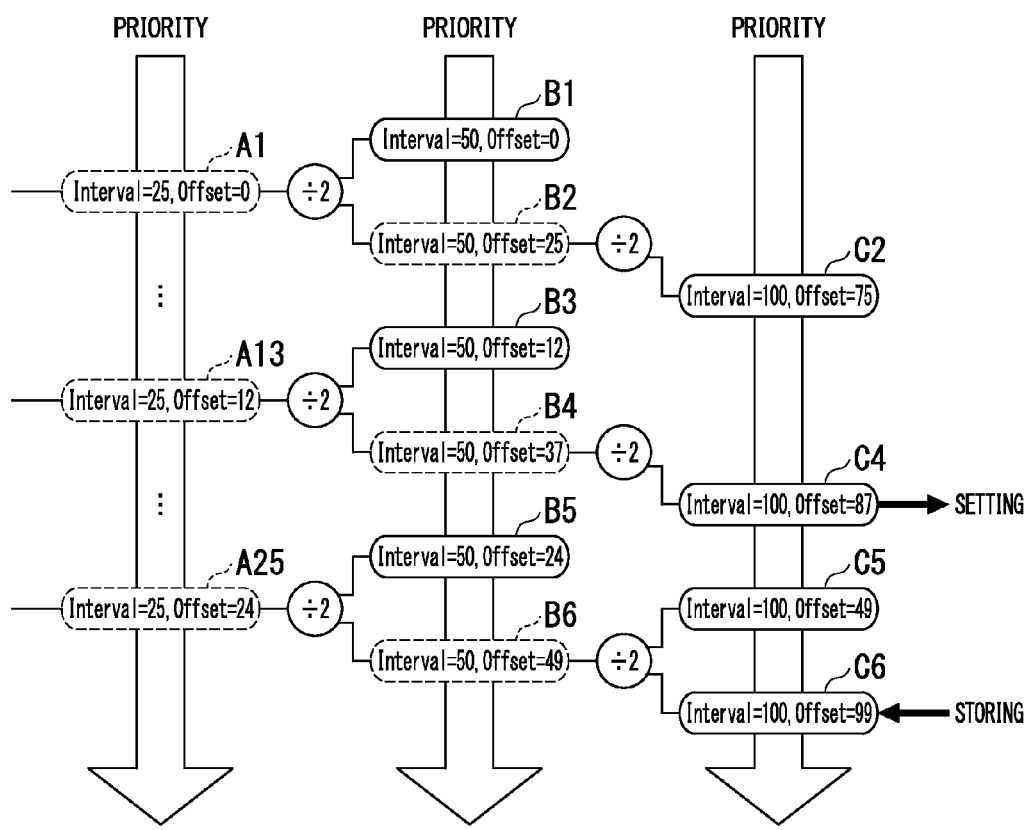
FIG. 12A is a diagram describing an example of defragmentation operations, which are performed by the system manager.
Figure 12B:
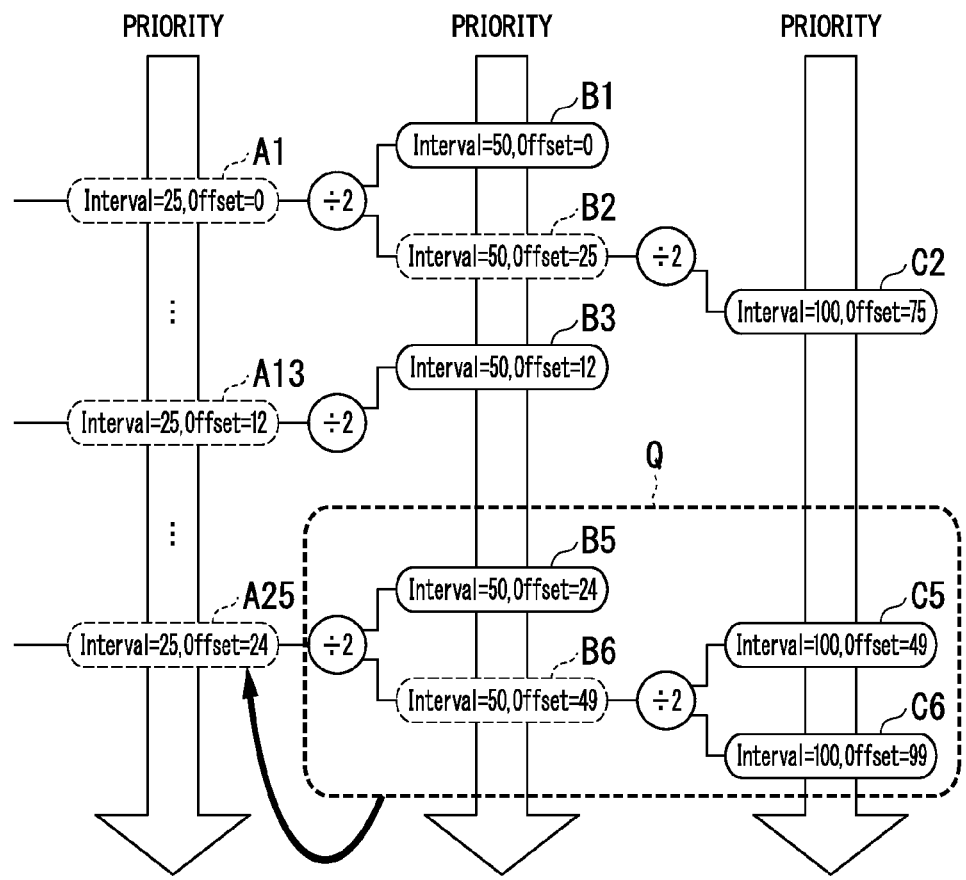
FIG. 12B is a diagram describing an example of defragmentation operations, which are performed by the system manager.
Figure 13:
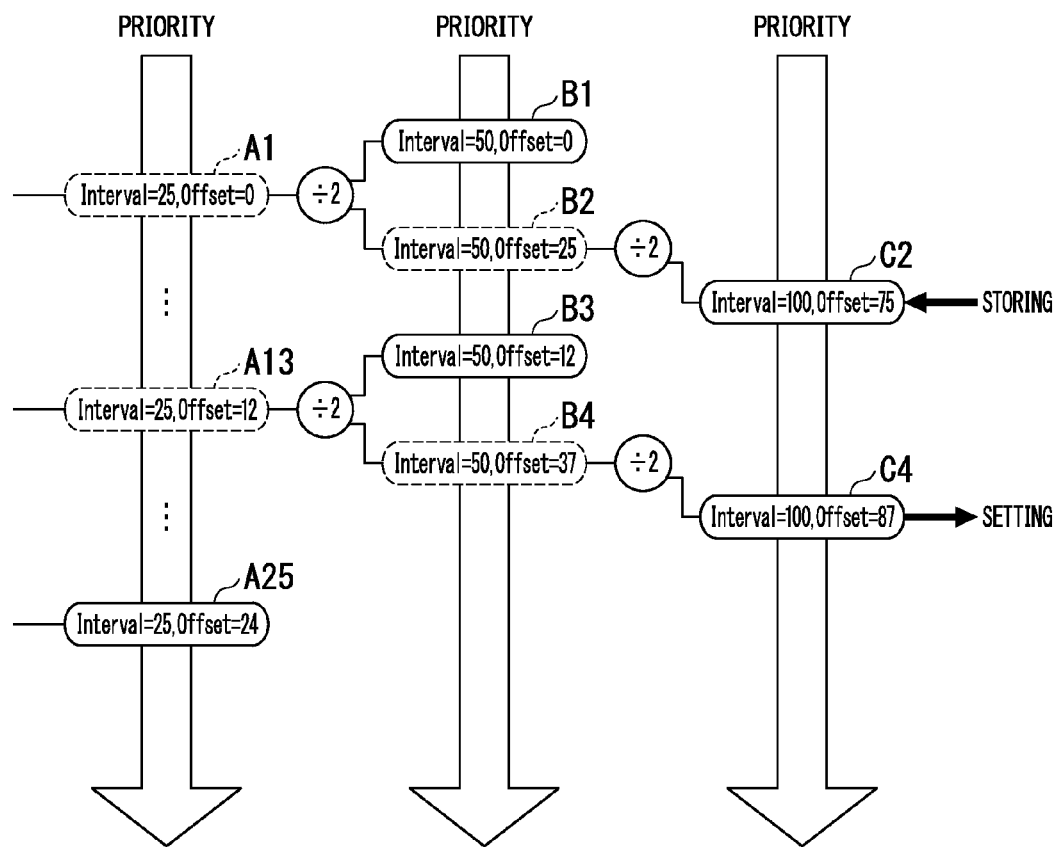
FIG. 13 is a diagram describing an example of defragmentation operations, which are performed by the system manager.
Figure 14:
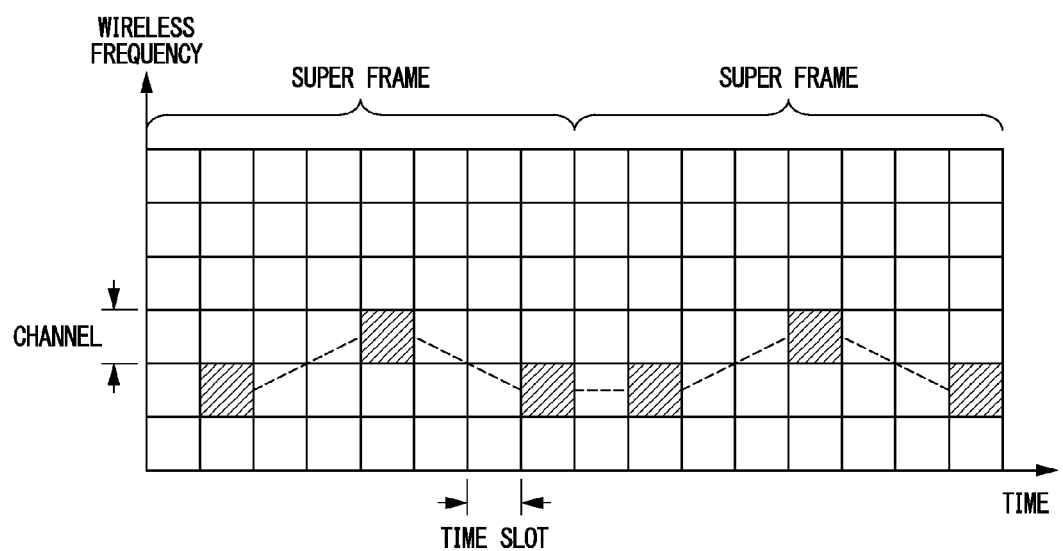
FIG. 14 is a diagram describing an example of super frames.
Figure 15:
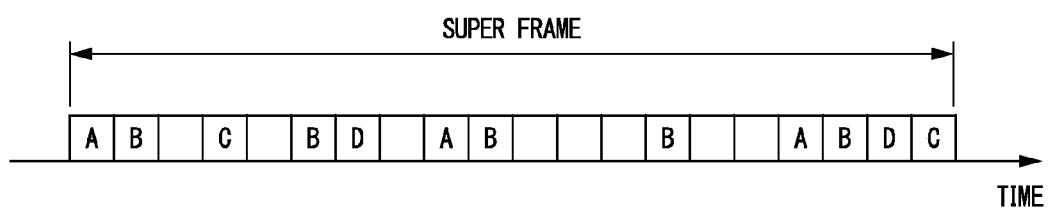
FIG. 15 is a diagram showing an example of communication links set in the super frame.

FIG. 11 is a flow chart showing defragmentation operations, which are performed by the system manager. Each of FIGS. 12A, 12B, and 13 is a diagram describing the defragmentation operations, which are performed by the system manager. The defragmentation is sequentially performed while changing the targeted wireless device. Since the flow chart shown in FIG. 11 shows the process with respect to a single wireless device, actually, the process shown in the flow chart of FIG. 11 is repeatedly performed while changing the targeted wireless device. The flow chart shown in FIG. 11 is periodically performed independently of the above-stated communication link setting operations and communication link cancellation operations.

When the wireless device, which is the target of the defragmentation, is specified by the controller 23, the process of the flow chart shown in FIG. 11 is started. When the process is started, firstly, the controller 23 performs a process for specifying one communication link, which is previously set to the targeted wireless device, and notifying the one communication link to the resource manager 23a (step S31). Next, the resource manager 23a determines whether a communication link, which is combinable with the one communication link specified in the step S31, is stored in the storage 22 (step S32). In particular, the resource manager 23a determines whether the communication link, which is formed at the same time as the one communication link specified in the step S31, is stored in the storage 22, with reference to the priority assigned to the communication link and the like.

When the resource manager 23a determines that the combinable communication link is stored in the storage 22 (the determination result in the step S32 is "YES"), the resource manager 23a determines whether a communication link, which is exchangeable for the one communication link specified in the step S31, is stored in the storage 22 (step S33). In particular, the resource manager 23a determines whether a communication link, which has the same interval as that of the one communication link specified in the step S31, is stored in the storage 22 (except a communication link as the base of the determination of the step S32).

When the resource manager 23a determines that the exchangeable communication link is stored in the storage 22 (the determination result in the step S33 is "YES"), the resource manager 23a performs a process for changing and combining the one communication link specified in the step S31 (step S34). After this process is finished, the controller 23 determines whether other communication links previously set to the targeted wireless device exist (step S35). The controller 23 performs the process of the step S31 when the controller 23 determines that the other communications exist (the determination result is "YES") and the controller 23 finishes the series of process shown in FIG. 11 when the controller 23 determines that the other communications do not exist (the determination result is "NO").

On the other hand, when the resource manager 23a determines that the combinable communication link is not stored in the storage 22 in the step S32 (the determination result is "NO"), the resource manager 23a determines whether a communication link, which is exchangeable for the one communication link specified in the step S31 and has a higher priority, is stored in the storage 22 (step S36). In particular, the resource manager 23a determines whether a communication link, which has the same interval as that of the one communication link specified in the step S31 and a higher priority than that of the one communication link specified in the step S31 is assigned to, is stored in the storage 22.

When the resource manager 23a determines that a communication link, which is exchangeable and has a higher priority, is stored in the storage 22 (the determination result in the step S36 is "YES"), the resource manager 23a performs a process for changing the one communication link specified in the step S31 (step S37). After this process is finished, the controller 23 determines whether other communication links previously set to the targeted wireless device exist in the step S35.

When the resource manager 23a determines that the exchangeable communication link is not stored in the storage 22 in the step S33 (the determination result is "NO"), the process of the step S34 is not performed and the process of the step S35 is performed. When the resource manager 23a determines that a communication link, which is exchangeable and has a higher priority, is not stored in the storage 22 in the step S36 (the determination result is "NO"), the process of the step S37 is not performed and the process of the step S35 is performed.

The case will be considered where the communication link specified in the step S31 is the communication link C6 shown in FIG. 12A and the three communication links C2, C4, and C5, each of which has the same interval as that of the communication link C6, are stored in the storage 22 at the time when the process of the step S31 is performed as shown in FIG. 12A. Since the communication link C5 shown in FIG. 12A is combinable with the communication link C6 specified in the step S31, the determination result in the step S32 is "YES". Since the communication links C2 and C4, each of which has the same interval as that of the communication link C6 specified in the step S31 and is other than the communication link C5, are stored in the storage 22, the determination result in the step S33 is also "YES".

The process of the step S31 is performed by the resource manager 23a. In particular, firstly, the process for reading the communication link C4 having the higher priority than that of the communication link C2 from the storage 22 and setting the communication link C4 is performed at the same time when storing the communication link C6 specified in the step S31 into the storage 22 so as to change the communication links as shown in FIG. 12A. Next, since the communication link C6, which is combinable with the communication link C5, is stored in the storage 22 as shown in FIG. 12B, the process for combining these communication links C5 and C6 is performed.

In the example shown in FIG. 12B, since the communication link B6, which is combinable with the communication link B5, is formed by combining the communication links C5 and C6, a process for combining the communication links B5 and B6 is also performed. Thereby, in the example shown in FIG. 12B, a plurality of communication links included in the dashed rectangular region, which is assigned a character Q, are combined to form the communication link A25. Therefore, in the example shown in FIGS. 12A and 12B, since the previously set communication link is changed and combined with the communication link stored in the storage 22, the fragmentation of communication links can be prevented.

Next, the case will be considered where the one communication link specified in the step S31 is the communication link C2 shown in FIG. 13 and the communication link C4 is stored in the storage 22 at the time when the process of the step S31 is performed. Since the communication link C4 shown in FIG. 13 is not combinable with the communication link C2 specified in the step S31, the determination result in the step S32 is "NO". Since the communication link C4, which has the same interval as that of the communication link C2 specified in the step S31, is exchangeable, and has a higher priority, is stored in the storage 22, the determination result in the step S36 is "YES".

The process of the step S37 is performed by the resource manager 23a. In particular, the process for reading the communication link C4 from the storage 22 and setting the communication link C4 at the same time when storing the communication resource C2 specified in the step S31 into the storage 22 so as to perform for changing the communication links is performed as shown in FIG. 13. Therefore, in the example shown in FIG. 13, since the previously set communication link is changed by the communication link having a higher priority, communication links, each of which has a lower priority, can be collected in the storage 22. Thereby, since the communication links, each of which has a lower priority, are likely to be combined, the fragmentation of communication links can be prevented.

In the flow chart shown in FIG. 11, the changing process of communication links may be performed even if the combinable communication link exists and the exchangeable communication link does not exist (the determination result in the step S32 is "YES" and the determination result in the step S33 is "NO"). In particular, as a result of the comparison between the priority of the one communication link specified in the step S31 and that of the communication link determined as a combinable communication link in the step S32, if the priority of the one communication link specified in the step S31 is lower than that of the communication link determined as a combinable communication link in the step S32, the exchange of them may be performed.

As described above, in the present embodiment, unset communication links other than previously set communication links for wireless communications via the wireless network N1 are stored in the storage 22, and one communication link stored in the storage 22 is divided into a plurality of communication links and the plurality of communication links are set in accordance with the setting request of communication links. In the present embodiment, if there is a communication link where the setting is cancelled, the communication link is stored in the storage 22 and, if possible, is combined. In addition, in the present embodiment, the defragmentation of communication links is performed to prevent the fragmentation of communication links. Therefore, the decreasing of use efficiency of communication resources due to the fragmentation of communication links can be prevented.

Although the foregoing has been a description of the management apparatus, the managing method, and the wireless communication system according to one embodiment of the present invention, the present invention is not restricted by the above-stated embodiment and may be freely modified within the scope thereof. For example, in the above-stated embodiment, the description has been provided for the example of the wireless communication system for performing the wireless communications in conformance with ISA100.11a, but the present invention is applicable to a wireless communication system for performing wireless communications in conformance with WirelessHART (registered trademark).

In the above-stated embodiment, the description has been provided for the example where each of the backbone routers 13a and 13b, the system manager 14, and the gateway 15 is realized as a separate apparatus. However, arbitrary more than two apparatuses among them can be realized as a single apparatus. In order to improve the reliability, the system manager 14 may be a duplexed system manager having an active manager and a standby manager. If the system manager 14 is duplexed, the storage 22 may be provided to each of the system managers 14, which are duplexed, and the coincidence of the content of the storage 22 may be maintained, while a single storage 22 (for example, a file server), which is referable from both the system managers 14, which are duplexed, may be provided.

REFERENCE SIGNS LIST

1 Wireless communication system
11 Wireless device
12 Wireless router
13a, 13b Backbone router
14 System manager
22 Storage
23a Resource manager
N1 Wireless network

The invention claimed is:

1. A management apparatus for managing a wireless network, the management apparatus comprising:
   a storage storing unset communication links other than previously set communication links for a wireless communication via the wireless network among previously prepared communication links; and
   a manager configured to divide each communication link stored in the storage into a plurality of communication links and to set the plurality of communication links in accordance with a setting request of communication links, wherein
   when the manager forms a plurality of communication links having a same interval, the manager is configured to assign a higher priority to each of the plurality of communication links as the priority of the communication link, which is divided to form the plurality of communication links, increases, and
   when the manager repeatedly divides a single communication link to form a plurality of communication links, the manager is configured to assign a higher priority to each of the plurality of communication links as the interval of each of the plurality of communication links increases.

2. The management apparatus according to claim 1, wherein
   priorities in accordance with a previously defined rule are respectively assigned to the communication links, and
   when a plurality of communication links suitable for the setting request of communication links are stored in the storage, the manager is configured to preferentially set one communication link, to which a higher priority is assigned.

3. The management apparatus according to claim 1, wherein
   the manager is configured to combine one communication link, which is setting-cancelled, and other communication link having a same interval as that of the one communication link, and the one communication link and the other communication link are formed by dividing a single communication link.

4. The management apparatus according to claim 1, wherein
   when a second communication link exchangeable for the previously set communication link and having a priority higher than that of the previously set communication link is stored in the storage, the manager is configured to set the second communication link instead of the previously set communication link.

5. The management apparatus according to claim 1, wherein
   the manager is configured to divide the communication link stored in the storage into a plurality of communication links, each of the plurality of communication links has a wider interval, and the plurality of communication links have different offsets from each other.

6. A management apparatus for managing a wireless network, the management apparatus comprising:
   a storage storing unset communication links other than previously set communication links for a wireless communication via the wireless network among previously prepared communication links; and
   a manager configured to divide each communication link stored in the storage into a plurality of communication links and to set the plurality of communication links in accordance with a setting request of communication links, wherein
   when there is one communication link, which is setting-cancelled, the manager is configured to combine the one communication link, which is setting-cancelled, and other communication link stored in the storage and to store the combined communication link into the storage in accordance with one priority assigned to the one communication link, which is setting-cancelled, and other priorities assigned to the communication links stored in the storage.

7. A management apparatus for managing a wireless network, the management apparatus comprising:
   a storage storing unset communication links other than previously set communication links for a wireless communication via the wireless network among previously prepared communication links; and
   a manager configured to divide each communication link stored in the storage into a plurality of communication links and to set the plurality of communication links in accordance with a setting request of communication links, wherein
   when a first communication link combinable with the previously set communication link and a second communication link exchangeable for the previously set communication link are stored in the storage, the manager is configured to set the second communication link instead of the previously set communication link, to combine the previously set communication link and the first communication link, and to store the combined communication link into the storage.

8. A management apparatus for managing a wireless network, the management apparatus comprising:
   a storage storing unset communication links other than previously set communication links for a wireless communication via the wireless network among previously prepared communication links; and
   a manager configured to divide each communication link stored in the storage into a plurality of communication links and to set the plurality of communication links in accordance with a setting request of communication links, wherein when the manager divides the communication link having an interval X1 and an offset Y1 into N parts, the manager is configured to form N communication links, and each of the N communication links has an interval X2 and an offset Y2 represented by the following equation (1):

$$X2=X1*N$$

$$Y2=Y1+(i*X1) \quad (1)$$

where, in the equation (1), N is an integer equal to or greater than 2, and the variable i is an integer satisfying 0≤i<N.

9. A management apparatus for managing a wireless network, the management apparatus comprising:
a storage storing unset communication links other than previously set communication links for a wireless communication via the wireless network among previously prepared communication links; and
a manager configured to divide each communication link stored in the storage into a plurality of communication links and to set the plurality of communication links in accordance with a setting request of communication links, wherein
the manager determines whether one communication link having a same interval as that requested in the setting request is stored in the storage,
when the one communication link having the same interval as that requested in the setting request is stored in the storage, the manager is configured to set the one communication link stored in the storage,
when the one communication link having the same interval as that requested in the setting request is not stored in the storage, the manager is configured to divide other communication link having an interval smaller than that requested in the setting request among the communication links stored in the storage to form a divided communication link having the same interval as that requested in the setting request and to set the divided communication link.

10. A wireless communication system for performing a wireless communication via a wireless network, the wireless communication system comprising:
a plurality of wireless devices configured to performing the wireless communication via the wireless network; and
a management apparatus configured to set a communication link for performing the wireless communication among the wireless devices via the wireless network, the management apparatus comprising:
a storage storing unset communication links other than previously set communication links for the wireless communication via the wireless network among previously prepared communication links; and
a manager configured to divide each communication link stored in the storage into a plurality of communication links and to set the plurality of communication links in accordance with a setting request of communication links, wherein
when there is one communication link, which is setting-cancelled, the manager is configured to combine the one communication link, which is setting-cancelled, and other communication link stored in the storage and to store the combined communication link into the storage in accordance with one priority assigned to the one communication link, which is setting-cancelled, and other priorities assigned to the communication links stored in the storage.

11. The wireless communication system according to claim 10, wherein
priorities in accordance with a previously defined rule are respectively assigned to the communication links, and
when a plurality of communication links suitable for the setting request of communication links are stored in the storage, the manager is configured to preferentially set one communication link, to which a higher priority is assigned.

12. The wireless communication system according to claim 10, wherein
when a second communication link exchangeable for the previously set communication link and having a priority higher than that of the previously set communication link is stored in the storage, the manager is configured to set the second communication link instead of the previously set communication link.

13. The wireless communication system according to claim 10, wherein
the manager is configured to divide the communication link stored in the storage into a plurality of communication links, each of the plurality of communication links has a wider interval, and the plurality of communication links have different offsets from each other.

14. A wireless communication system for performing a wireless communication via a wireless network, the wireless communication system comprising:
a plurality of wireless devices configured to performing the wireless communication via the wireless network; and
a management apparatus configured to set a communication link for performing the wireless communication among the wireless devices via the wireless network, the management apparatus comprising:
a storage storing unset communication links other than previously set communication links for the wireless communication via the wireless network among previously prepared communication links; and
a manager configured to divide each communication link stored in the storage into a plurality of communication links and to set the plurality of communication links in accordance with a setting request of communication links, wherein
when a first communication link combinable with the previously set communication link and a second communication link exchangeable for the previously set communication link are stored in the storage, the manager is configured to set the second communication link instead of the previously set communication link, to combine the previously set communication link and the first communication link, and to store the combined communication link into the storage.

15. A managing method for managing a wireless network, the managing method comprising:
when a setting request of communication links is input, dividing an unset communication link other than previously set communication links for a wireless communication via the wireless network among previously prepared communication links into a plurality of communication links and setting the plurality of communication links;
when a first communication link combinable with the previously set communication link and a second communication link exchangeable for the previously set communication link are included in the unset communication link, setting the second communication link instead of the previously set communication link and combining the previously set communication link and the first communication link, and when the first communication link is not included in the unset communication link and the second communication link having a priority higher than that of the previously set communication link is included in the unset communication link, setting the second communication link instead of the previously set communication link.

16. The managing method according to claim 15, wherein priorities in accordance with a previously defined rule are respectively assigned to the communication links, and when a plurality of communication links suitable for the setting request of communication links are stored in the storage, dividing the unset communication link into the plurality of communication links and setting the plurality of communication links comprises preferentially setting one communication link, to which a higher priority is assigned.

17. The managing method according to claim 15, further comprising:

when there is one communication link, which is setting-cancelled, combining one communication link, which is setting-cancelled, and the unset communication link in accordance with one priority assigned to the one communication link, which is setting-cancelled, and other priority assigned to the unset communication link.

* * * * *